United States Patent
Sumner et al.

(10) Patent No.: US 9,264,842 B1
(45) Date of Patent: Feb. 16, 2016

(54) SECONDARY OPEN MOBILE ALLIANCE DEVICE MANAGEMENT PLATFORM

(71) Applicant: Sprint Communications Company L.P., Overland Park, KS (US)

(72) Inventors: Bret D. Sumner, Lawrence, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 193 days.

(21) Appl. No.: 14/171,774

(22) Filed: Feb. 3, 2014

(51) Int. Cl.
 *H04M 3/00* (2006.01)
 *H04W 4/00* (2009.01)
 *H04W 8/24* (2009.01)

(52) U.S. Cl.
 CPC .............. *H04W 4/001* (2013.01); *H04W 8/245* (2013.01)

(58) Field of Classification Search
 CPC ........... G06F 8/60; G06F 9/445; H04L 67/34; H04W 4/001; H04W 4/003; H04W 8/245
 USPC ................... 455/418–420, 423–466; 709/206
 See application file for complete search history.

(56) References Cited

U.S. PATENT DOCUMENTS

| | | | | |
|---|---|---|---|---|
| 8,615,581 | B2* | 12/2013 | Dare ................... | H04L 41/0253 370/352 |
| 8,620,959 | B1* | 12/2013 | Denton, III ....... | G06F 17/30557 703/3 |
| 2005/0144616 | A1* | 6/2005 | Hammond ................ | G06F 8/65 717/173 |
| 2008/0016339 | A1* | 1/2008 | Shukla .................... | G06F 21/53 713/164 |
| 2009/0067367 | A1* | 3/2009 | Buracchini ........... | H04W 8/245 370/328 |
| 2015/0082297 | A1* | 3/2015 | Parry ....................... | G06F 8/65 717/173 |

* cited by examiner

*Primary Examiner* — Wayne Cai
*Assistant Examiner* — Said Elnoubi

(57) ABSTRACT

A device management (DM) server. The server comprises a memory, a processor, and an application programming interface (API), wherein the secondary DM server makes available a subset of the functionality of a DM server and when accessed through a portal, initiates a DM session with a short message service (SMS) system type message, notifies the mobile communication devices associated with a trusted third party of secondary DM server via the short message service system type message, and makes available firmware to be downloaded from a sandbox of the secondary DM server and tested by a limited number of the mobile communication devices associated with the third party, wherein the sandbox is an area in a memory to isolate untested firmware or firmware under test from the environment outside the sandbox.

20 Claims, 7 Drawing Sheets

SECONDARY OPEN MOBILE ALLIANCE DEVICE MANAGEMENT PLATFORM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile phones are electronic devices that are used for mobile voice and/or data communications based on wireless network connectivity, which can be provided by base stations known as cell towers or sites. Such electronic devices may be associated with a mobile network operator directly or through a mobile virtual network operator (MVNO). The mobile virtual network operator is the wireless communication services provider that does not own the wireless network infrastructure or the radio spectrum over which the mobile virtual network operator provides services to the customers. A mobile virtual network operator may have its own customer relationship management, marketing, customer service, or billing support systems. Mobile phones associated with the mobile virtual network operator may be activated, configured, or updated by the mobile network operator.

SUMMARY

In an embodiment, a secondary device management (DM) server is disclosed. The DM server comprises a memory, a processor, and an application programming interface (API), wherein the secondary DM server makes available a subset of the functionality of a DM server and when accessed through a portal, initiates a DM session with a short message service (SMS) system type message, notifies the mobile communication devices associated with a trusted third party of secondary DM server via the short message service system type message, makes available firmware to be downloaded from a sandbox of the secondary DM server and tested by a limited number of the mobile communication devices associated with the third party, wherein the sandbox is an area in a memory to isolate untested firmware or firmware under test from the environment outside the sandbox, deletes problematic firmware from the sandbox, and requests to move tested firmware that meets predefined criteria to a production area of the DM server, whereby the third party has restricted access to the firmware activation or updating process.

In an embodiment, a method of managing mobile communication devices through a third party portal is disclosed. The method comprises initiating a device management (DM) session between a secondary DM server and a client application on a mobile communication device with a short message service system type message from a secondary DM server, wherein the secondary DM server makes available a subset of the functionality of a primary DM server, notifying the mobile communication devices associated with the third party of the secondary DM server via the short message service system type message, and making available firmware to be downloaded from a sandbox of the secondary DM server and tested by a limited number of the mobile communication devices associated with the third party, wherein the sandbox is an area in a memory to isolate untested firmware or firmware under test from the environment outside the sandbox. The method further comprises auditing the testing process by the primary DM server based on predefined criteria, deleting problematic firmware from the sandbox, and when the firmware meets the criteria, requesting the primary DM server to move the tested firmware to a production area, where the firmware stored in the production area is available to more mobile communication devices, whereby the third party has restricted access to the firmware activation or updating process.

In an embodiment, a method of managing mobile communication devices through a third party portal is disclosed. The method comprises initiating a device management (DM) session with a short message service system type message, downloading firmware to a limited number of mobile communication devices from a sandbox of a secondary DM server and testing it on the mobile communication devices, wherein the sandbox is an area in a memory to isolate untested firmware or firmware under test from the environment outside the sandbox and wherein the secondary DM server makes available a subset of the functionality of a DM server, and when the firmware meets predefined criteria, requesting a primary DM server to move the tested firmware to a production area, where the firmware stored in the production area is available to more mobile communication devices.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
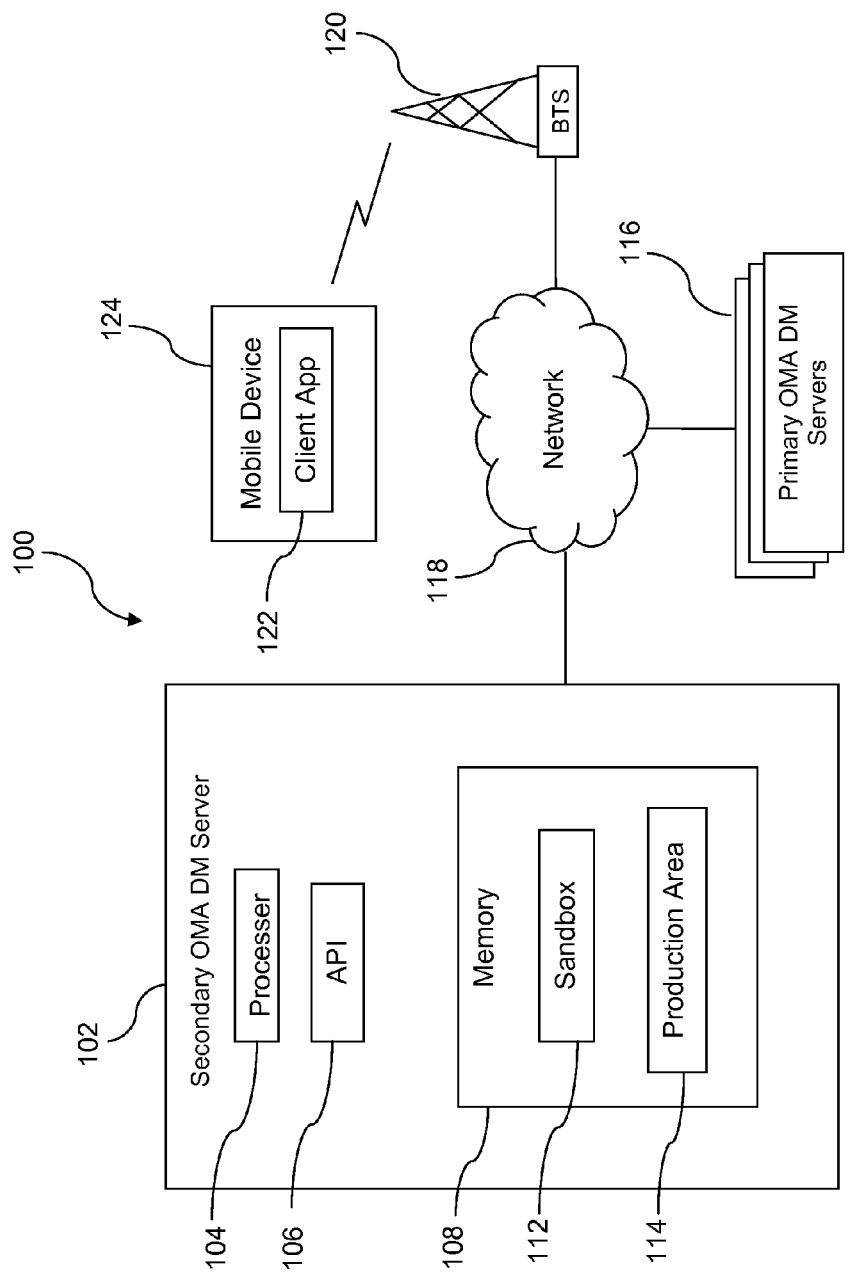
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Existing device management platforms for wireless communication service systems are proprietary and grant access to the mobile network operator, but do not grant access to a third party reseller. The third party reseller may also be referred to in some contexts as a mobile virtual network operator (MVNO). The third party reseller and mobile virtual network operator may be two interchangeable terms. The mobile network operator is a wireless communication services provider that owns the radio spectrum and/or wireless network infrastructure over which the mobile network operator provides services to its customers. On the other hand, the mobile virtual network operator is the wireless communication services provider that does not own the wireless network infrastructure or the radio spectrum over which the mobile virtual network operator provides services to the customers. When third party resellers desire their own device management servers, problems with a single client and multiple servers may be introduced, for example contention. Also, the corresponding mobile virtual network operator may prefer to reserve the signed certificates instead of distributing them to the third party reseller. Signed certificates may grant one the access to confidential information on the whole communication network in addition to the device management server. Aspects of a secure, interoperable, and controlled device management platform may be advantageous for the mobile network operator to provide to the third party reseller.

Disclosed herein is a system and method for device management through a third party portal for firmware activation and updating. In an embodiment, an open mobile alliance (OMA) device management (DM) server may be accessed through an application programming interface (API) by a third party reseller. The OMA DM server may initiate an OMA DM communication session with an OMA DM client application on a mobile communication device via a short message service (SMS) system type message comprising the OMA DM server name. An SMS system type message may not be presented or notified to a user of a mobile communication device but may be directed to or forwarded to an application on the mobile communication device, for example to an OMA DM client application. In some contexts, an SMS system type message may be referred to as a silent SMS message. The OMA DM server may store firmware in a sandbox for a limited number of mobile communication devices associated with the third party reseller for downloading. The mobile communication devices that downloaded the firmware may test the firmware based on predefined criteria. The testing process and activities may be monitored, and recorded in a sandbox testing activity log. When the tested firmware falls below predefined criteria, the OMA DM server may remove the firmware from the sandbox. When the tested firmware meets the predefined criteria, the qualified firmware may be moved to a production area of the OMA DM server. When the firmware is stored in the production area, the firmware may be available to more mobile communication devices for downloading. While an open mobile alliance device management platform is used throughout as an example and preferred embodiment, it is understood that the teachings of the disclosure may be applied to other device management protocols.

This allows a third party reseller to have their own device management servers and have restricted access to firmware activation or updating process. At the same time, by assigning a secondary device management server to the third party reseller and keeping primary device management servers to the mobile network operator, this protects the mobile network operator from having to grant the third party reseller access to confidential information on the whole communication network, wherein the secondary device management server makes available a subset of the functionality of the primary device management server.

Turning now to FIG. 1, a communication system 100 is described. In an embodiment, the system 100 comprises a secondary open mobile alliance (OMA) device management (DM) server 102, a plurality of mobile communication devices 124, and a plurality of primary OMA DM servers 116. The secondary OMA DM server 102 may comprise a processer 104, an application programming interface (API) 106, and a memory 108. The memory 108 may comprise a production area 114 and a sandbox 112. The mobile communication device 124 may comprise a client application 122. The mobile communication device 124 is configured to use a radio transceiver to establish a wireless communication link with a base transceiver station (BTS) 120, and the base transceiver station 120 provides communications connectivity of mobile communication device 124 to a network 118. One or more primary OMA DM servers 116 may also have access to the network 118. The network 118 may comprise any combination of private and public networks.

It is understood that the system 100 may comprise any number of mobile communication devices 124, any number of primary OMA DM servers 116, and any number of base transceiver stations 120. The collectivity of base transceiver stations 120 may be said to comprise a radio access network, in that these base transceiver stations 120 may provide a radio communication link to the mobile communication devices 124 to provide access to the network 118. The radio access network may be abstracted in different ways and may comprise, in addition to the base transceiver stations 120, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 124.

The radio transceiver may communicate with the base transceiver station 120 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The mobile communication device 124 may be any of a mobile phone, a personal digital assistant (PDA), a laptop computer, a notebook computer, a tablet computer, or another mobile communication device. In an embodiment, the mobile communication device 124 may have other components (not shown) such as a near field communication (NFC) radio transceiver, a wireless local area network (WLAN) radio transceiver, or other components.

In an embodiment, the division of the secondary OMA DM server 102 and the primary OMA DM server 116 may be from a logical perspective, and the secondary OMA DM server 102 and the primary OMA DM server 116 may locate in different combinations of physical computers. For example, an OMA DM server may be an instance of the OMA DM software application, and one physical computer may run multiple OMA DM software application instances. It should be noted that the communication between the primary OMA DM server 116 and the secondary OMA DM server 102 may not involve a network, as the network 118 illustrated in FIG. 1. The secondary OMA DM server 102 and the primary OMA DM server 116 may be located in one computer—for example, a server computer, in two different computers—for example, a server computer for the secondary OMA DM server 102, and another computer for the primary OMA DM server 116, in multiple different computers—for example, a server computer for the secondary OMA DM server 102, and other multiple computers for the primary OMA DM servers 116, or in some other combination of computers. When the secondary OMA DM server 102 and the primary OMA DM server 116 may be located in one and the same physical computer, the secondary OMA DM server 102 may share the same processor and memory as the primary OMA DM server 116. The secondary OMA DM server 102 may be implemented in the way of distributed computing. In addition, the OMA DM servers 102 or 116 may be regionally distributed. For example, content may be stored at geographically distributed OMA DM servers 102 or 116 so that mobile communication devices 124 at different geographical locations may download from the closest OMA DM server.

The application programming interface 106 may be built as a portal to access the secondary OMA DM server 102. For example, the application programming interface 106 may provide controlled access to the secondary OMA DM server 102 by a third party reseller, for example a mobile virtual network operator. The application programming interface 106 may be built as a graphical user interface (GUI). In currently existing systems, a third party reseller may have little access to device management servers, for example OMA DM servers 102 and 116, to activate or update firmware on associated mobile communication devices 124. With the application programming interface 106, a third party reseller may have restricted access to the secondary OMA DM server 102 to conduct at least one of activation, provisioning, configuration, firmware upgrades, firmware updates, preferred roaming list (PRL) update, or over the air programming (OTA).

It should be noted that a separate application programming interface or other interfaces may be utilized by the mobile network operator that are different from the application programming interface 106. For example, an application programming interface different from the application programming interface 106 may be utilized by the mobile network operator to transmit updates to mobile communication devices associated directly with the mobile network operator. As another example, an application programming interface different from the application programming interface 106 may be utilized by the mobile network operator to transmit updates to mobile communication devices associated directly with the mobile network operator, and another application programming interface also different from the application programming interface 106 may be utilized by the mobile network operator to transmit updates to the mobile communication devices 124 associated with the third party reseller.

In an embodiment, the application programming interface 106 may be part of a web service. A web service is a software application that supports communication between electronic devices across a network. The web service may enable OMA DM platforms to bypass the restrictions of an individual OMA DM platform. The third party reseller may access the secondary OMA DM server 102 through the web service, instead of accessing the secondary OMA DM server 102 or primary OMA DM server 116 directly. In this way, the privileges of the third party reseller with the secondary OMA DM server 102 may be controlled. The web services is exposed through the application programming interface 106, and the third party reseller may integrate the web services into their customer relationship management (CRM) application. The application programming interface 106 may prevent some functionality of the primary OMA DM server 116 from the secondary OMA DM server 102. In an embodiment, the application programming interface 106 may provide the third party reseller with a subset of the functionality of the primary OMA DM server 116. The functionality assigned to a certain secondary OMA DM server 102 may be based on the trust level of the secondary OMA DM server 102 and may vary from one secondary OMA DM server to another secondary OMA DM server. For example, a secondary OMA DM server may be able to assign up to 100 mobile communication devices 124 to download firmware from the sandbox 112 at a time, but another secondary OMA DM server may be able to assign up to 50 mobile communication devices 124 to download firmware from the sandbox 112 at a time. The subset of functionality assigned by the primary OMA DM server 116 to the secondary OMA DM server 102 may not be fixed at all times and may be changed under predefined circumstances. For example, selected communication bands may be turned on for the mobile communication devices 124 associated with the third party reseller under predefined circumstances.

A workflow engine may be utilized to manage privileges of the application programming interface 106. A workflow engine is a software application that manages computer processes. The workflow engine may interpret events and act on the interpreted events. The workflow engine may check whether the current command is valid in executing a task, whether the current user is permitted to execute the task, or execute the task or flag an error. In an embodiment, the workflow engine may check whether the current command is valid in executing the current task, whether the third party reseller is permitted to execute requested commands, execute the requested task, or flag an error.

In an embodiment, the client application 122 may be an OMA DM client application on a mobile communication device 124 and may communicate with an OMA DM server 102 or 116 after identification authentication or validation. The communication between the client application 122 and the OMA DM server 102 or 116 may be initiated by either the client application 122 or the OMA DM server 102 or 116 with a short message service (SMS) message. For example, when the client application 122 sends a request to the primary OMA DM server 116, an OMA DM session is initiated. The client application 122 may support access to multiple OMA DM servers 102 or 116. For example, the client application 122 may communicate to both the primary OMA DM server 116 and the secondary OMA DM server 102.

Once the communication is initiated, and a communication session is established between the client application 122 and the OMA DM server 102 or 116, a sequence of messages may be exchanged to accomplish a device management task. Besides conducting the communication between the client application 122 and the OMA DM server 102 or 116, the client application 122 may execute commands from the OMA DM server 102 or 116. For example, if a binary installation file for a program is transmitted to the mobile communication device 124, the client application 122 may install the binary program. In addition, the client application 122 may return the result of executing the command to the OMA DM server 102 or 116 via a reply short message service message.

Currently, mobile communication devices report to a core or central OMA DM server. In an embodiment, the client application 122 may be configured to be communicatively coupled to multiple OMA DM servers. For example, the client application 122 may be communicatively coupled to both the secondary OMA DM server 102 and the primary OMA DM server 116. In current systems, returning data back from the mobile communication device 124, for example data about the activities of the mobile communication device 124, is not supported. In an embodiment, returning data back from the mobile communication device 124 may be supported with a secondary OMA DM server 102 with a specific third party reseller.

The OMA DM is a device management protocol that is designed to manage small mobile communication devices, for example a mobile phone or a personal digital assistant. The OMA DM is intended to support provisioning, configuration of device, software upgrades, firmware updates, fault management, or another device management feature. An OMA DM server 102 or 116 may communicate with a mobile communication device 124 with a sequence of messages after identification validation. The OMA DM server 102 or 116 may send the server name to the mobile communication device 124 when initiating an OMA DM session so that the mobile communication device 124 may reply to the OMA DM server 102 or 116 that initiated the OMA DM session. When the secondary OMA DM server 102 is part of an OMA DM task and the primary OMA DM server 116 initiated the session, upon the receipt of the reply message from the mobile communication device 124, the primary OMA DM server 116 may direct the mobile communication device 124 to the secondary OMA DM server 102 directly or to the primary OMA DM server 116 first for some action and then to the secondary OMA DM server 102. In an embodiment, a primary OMA DM server 116 may be a server that has more privileges than a secondary OMA DM server 102. In other words, a secondary OMA DM server 102 may make available a subset of the functionality of a primary OMA DM server 116. The primary OMA DM server 116 may be said to be in a trusted environment itself, and a sub-trusted environment may be created to accommodate the secondary OMA DM server 102.

In an embodiment, the primary OMA DM servers have two levels of privileges, testing and proposal level and secondary level. In an embodiment, the primary OMA DM server 116 may audit or monitor the process of firmware testing by the mobile communication devices 124 associated with the secondary OMA DM server 102 with predefined criteria. In an embodiment, the criteria may be one or more of successful completion of a mandatory suite of test doses, completion of a required testing, completion and review by the mobile network operator, and completion with no high severity faults. It should be noted that other device management objects, for example provisioning, configuration of device, or software upgrades, may also be managed in the same way as firmware. For example, provisioning, configuration of device, or software upgrades may be stored in the sandbox for downloading and testing. For example, the primary OMA DM server 116 may keep a log of the testing activities of the firmware from the sandbox 112. When the tested firmware meets the criteria and the secondary OMA DM server 102 requests to move the firmware from the sandbox 112 to the production area 114, the primary OMA DM server 116 may move the qualified firmware to the production area 114. Alternatively, depending on the trust level of the third party reseller or the secondary OMA DM server 102, the primary OMA DM server 116 may grant the permission for the secondary OMA DM server 102 to move the qualified firmware to the production area 114. The limit for the number of requests from a third party reseller to move firmware from the sandbox 112 to the production area 114 in a predetermined time period may vary depending on the traffic from the primary OMA DM server 116, the secondary OMA DM server 102, and how the traffic is directed between the primary and secondary OMA DM servers 116 and 102. The stored firmware in the production area 114 may be available to more mobile communication devices 124 than when the firmware was in the sandbox 112.

In current systems, a third party reseller requests to a primary OMA DM server 116 to move the device record to a sandbox 112 before the third party reseller is enabled by the primary OMA DM server 116 to move an activated mobile communication device 124 to a testing group. In current systems, a device record is data of a mobile communication device 124 that when moved to the sandbox 112, enables the third party reseller to have visibility of the mobile communication device 124. When the device record is in the sandbox 112, the mobile communication device 124 is said to be in the testing group. And not until the mobile communication device is moved into the testing group does the third party reseller have some visibility of the mobile communication device 124.

In an embodiment, the third party reseller may move some mobile communication devices 124 to the group that has the accessibility to the sandbox 112 without requesting to the primary OMA DM server 116. With the application programming interface 106 and the secondary OMA DM server 102, the visibility may be tied to both the third party reseller identification (ID) and the sandbox 112. The number of the mobile communication devices 124 that may be placed in the group that may access the sandbox 112 to download and test a piece of firmware may be limited, for example to 10, 50, 100, or another amount. In an embodiment, a field of mobile communication devices 124 may be assigned at initiation for testing firmware from the sandbox 112. For example, a field of a parameter for configuration may be flagged on a limited number of mobile communication devices 124 at initiation. Mobile communication devices 124 other than the devices assigned to test firmware from the sandbox 112 may not be moved by the secondary OMA DM server 102 to the group that may access the sandbox 112. Identification information such as mobile equipment identifiers (MEIDs) may be passed through the web service to the secondary OMA DM server 102 to identify the mobile communication devices 124 that are intended to access the sandbox 112.

In an embodiment, the sandbox 112 may be an isolated environment to temporarily store firmware before the firmware is ready for a large number of mobile communication devices 124 to download. For example, the sandbox 112 may store firmware to be tested and firmware under testing. It should be noted that other device management objects, for example provisioning, configuration of device, or software upgrades, may also be managed in the same way as firmware. For example, provisioning, configuration of device, or software upgrades may be stored in the sandbox. The sandbox may be accessible to the secondary OMA DM server 102 through the application programming interface 106. In an embodiment, the secondary OMA DM server 102 may store firmware in the sandbox 112 and a limited number of mobile communication devices 124 associated with the third party reseller may download the firmware from the sandbox 112. Alternatively, a field of mobile communication devices 124 may be assigned to the sandbox 112 at initiation. The mobile communication devices 124 may be differentiated from other mobile communication devices 124 by identification information such as a mobile equipment identifier. The primary OMA DM server 116 may audit the process of the firmware testing based on predefined criteria. When the tested firmware is problematic, the third party reseller may remove it from the production area 114 without requesting to the primary OMA DM server 116.

When the tested firmware meets the criteria, the firmware may be moved to the production area 114 upon the request of the third party reseller. In an embodiment, the firmware stored in the production area 114 may be available to more mobile communication devices 124. For example, the firmware in the production area 114 may be available for all mobile communication devices 124 associated with the third party reseller to download.

In an embodiment, the secondary OMA DM server 102 enables the third party reseller to manage the mobile communication devices with restricted privileges. For example, the third party reseller may activate and/or update firmware on the mobile communication devices 124 with the secondary OMA DM server 102 through the application programming interface 106. The third party reseller may realize provisioning on the mobile communication devices 124 and/or over the air programming with the secondary OMA DM server 102. In addition, the third party reseller may transmit preferred roaming lists to the mobile communication devices 124 through the secondary OMA DM server 102.

The secondary OMA DM server 102 may initiate an OMA DM communication session with the client application 122 via a short message service system type message. A short message service system type message, or a silent short message service message, is a hidden short message service message that is not presented to the end user when arriving at an electronic device. The short message service system type message is hidden from the short message service messaging application and is processed by the electronic device without user interruption or user interaction. In an embodiment, the secondary OMA DM server 102 may comprise the address of the secondary OMA DM server 102 so that the mobile communication device 124 may reply to the secondary OMA DM server 102 that initiated the OMA DM session.

In an embodiment, the secondary OMA DM server 102 may store firmware in the sandbox 112 for a limited number of mobile communication devices 124 to download. The mobile communication devices 124 may test the downloaded firmware. The primary OMA DM server 116 may monitor the testing process and decide whether the tested firmware meets predefined criteria. Alternatively, the secondary OMA DM server 102 may decide whether the tested firmware meets predefined criteria from the primary OMA DM server 116. The secondary OMA DM server 102 may send a message to the primary OMA DM server 116 about the status of the tested firmware. For example, when the tested firmware meets the criteria, the secondary OMA DM server 102 may send a message to notify the primary OMA DM server 116 of the qualification of the firmware. On the contrary, when the firmware falls below the criteria in testing, the secondary OMA DM server 102 may remove the firmware from the sandbox 112.

When the tested firmware is determined to have met the criteria and may be moved to the production area 114, the firmware may be moved to the production area 114 and will be available for the associated mobile communication devices 124 to download. A limited number of mobile communication devices 124 may be enabled to download the firmware in a period of time, for example every one hour, every five hours, every 24 hours, or another time interval, to be allowed to download the stored firmware in the production area 114. For example, 100 mobile communication devices 124 may be allowed to download the qualified firmware in the production area 114 every two hours, 1000 mobile communication devices 124 every four hours, 2000 mobile communication devices 124 every five hours, or another number of devices in another time period.

The secondary OMA DM server 102 may only communicate with the mobile communication device 124 with selected wireless technology. For example, the secondary OMA DM server 102 may communicate with the mobile communication device 124 only via a wireless local area network connection when the size of the payload to download is big. The secondary OMA DM server 102 may communicate with the mobile communication device 124 only via either long-term evolution or wireless local area network connection when the firmware or other update materials to download is not critical. Additionally, when the firmware or other update materials to download is of the highest priority, any available communication link may be utilized to communicate between the secondary OMA DM server 102 and the mobile communication device 124. The mobile communication device 124 may generate a reply message with its network status to send to the secondary OMA DM server 102. The secondary OMA DM server 102 may decide whether to send the payload, the firmware or other update materials to be downloaded, to the mobile communication device 124 based on the available network at the mobile communication device 124 and the priority of the payload. For example, when a piece of firmware or other update materials are determined to be transmitted only with wireless local area network but wireless local area network is not available at the mobile communication device 124, the secondary OMA DM server 102 may delay the transmission until when the wireless local area network is available at the mobile communication device 124. Alternatively, the secondary OMA DM server 102 may send a lighter payload instead of the whole payload. As another example, if the mobile communication device 124 is roaming, the secondary OMA DM server 102 may choose not to transmit the payload at the time due to the high cost of roaming data.

Figure 2:
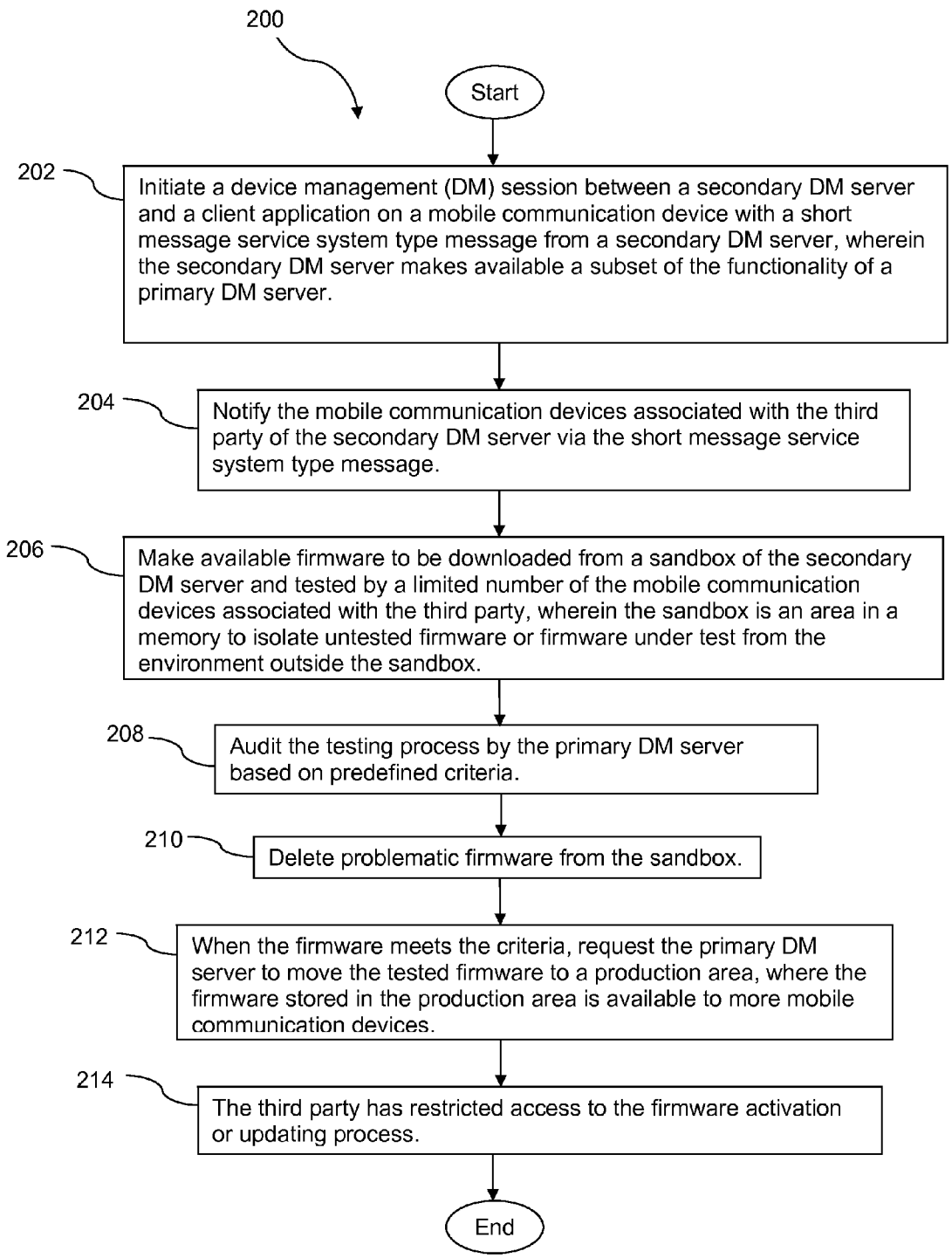
FIG. 2 is a flow chart illustrating a method according to an embodiment of the disclosure.

Turning now to FIG. 2, a method 200 is described. At block 202, a device management (DM) session is initiated between a secondary DM server and a client application on a mobile communication device with a short message service system type message from a secondary DM server, wherein the secondary DM server makes available a subset of the functionality of a primary DM server. For example, a short message service system type message may be sent from the secondary OMA DM server 102 to the OMA DM client application 122 on the mobile communication device 124 to initiate an OMA DM session. In an embodiment, the secondary OMA DM server 102 may make possible a subset of the functionality of the primary OMA DM server 116.

At block 204, the mobile communication devices associated with the third party are notified of the secondary DM server via the short message service system type message. For example, the short message service system type message from the secondary OMA DM server 102 may comprise the name of the secondary OMA DM server 102. With the information of the secondary OMA DM server 102, the mobile communication device 124 may reply to the exact OMA DM server 102 that initiated the OMA DM communication session. At block 206, firmware is made available to be downloaded from a sandbox 112 of the secondary DM server and tested by a limited number of the mobile communication devices associated with the third party, wherein the sandbox 112 is an area in a memory to isolate untested firmware or firmware under test from the environment outside the sandbox. For example, a limited number of mobile communication devices 124 associated with the third party reseller may download the firmware from the sandbox 112 on the secondary OMA DM server 102 and test the downloaded firmware on the mobile communication devices 124. The third party may collect testing results from the mobile communication devices 124 in a variety of ways. For example, the mobile communication devices 124 that are assigned to test the firmware may be configured to send messages back to the secondary OMA DM server 102 comprising testing results of the firmware. As another example, staff from the third party reseller may test the firmware on the mobile communication devices 124 in a test center of the third party reseller. The third party reseller may make changes to the tested firmware according to predefined rules by the primary OMA DM server 116 and store the updated firmware in the sandbox 112 after making those changes.

At block 208, the testing process is audited by the primary DM server based on predefined criteria. The primary OMA DM server 116 may audit the process of the firmware testing based on predefined criteria. In addition, the primary OMA DM server 116 may keep a log for the testing activities of the firmware in the sandbox 112. For example, the primary OMA DM server 116 may know whether the changed version of a piece of firmware has been replaced based on the log for the activities of the sandbox 112. At block 210, problematic firmware is deleted from the sandbox 112. For example, when the secondary OMA DM server 102 finds problems with the firmware, the firmware may be removed from the sandbox 112. The firmware removed from the sandbox 112 may be modified and tested again later after stored in the sandbox 112 again.

At block 212, when the firmware meets the criteria, request the primary DM server to move the tested firmware to a production area, where the firmware stored in the production area is available to more mobile communication devices 124. For example, the third party reseller or the secondary OMA DM server 102 may request the primary OMA DM server 116 to move qualified firmware to the production area 114 once the firmware meets criteria from the primary OMA DM server 116. When the qualified firmware is stored in the production area 114, the firmware may be available to more mobile communication devices 124 for downloading. At block 214, the third party has restricted access to the firmware activation or updating process. For example, the third party reseller has controlled access to activate or update the firmware on the mobile communication devices 124 associated with the third party reseller.

Figure 3:
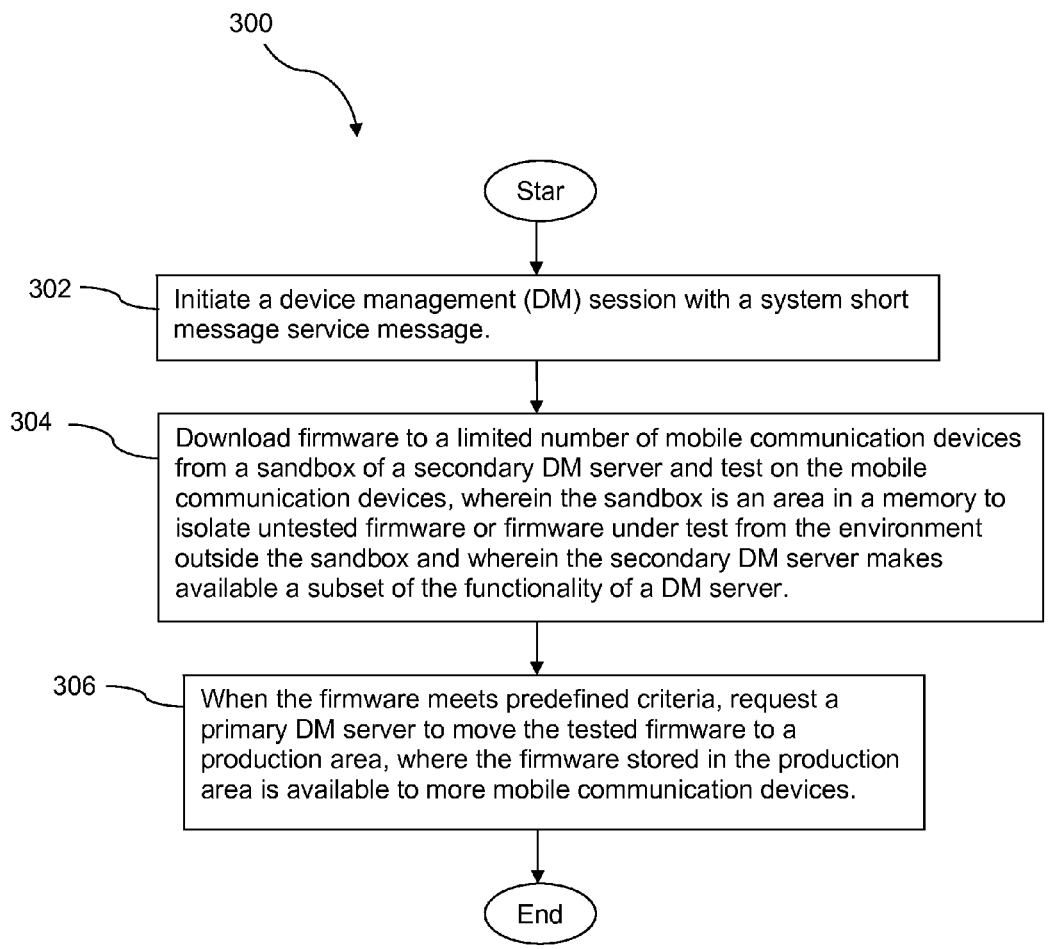
FIG. 3 is a flow chart illustrating another method according to an embodiment of the disclosure.

Turning now to FIG. 3, a method 300 is described. At block 302, a device management (DM) session is initiated with a short message service system type message. For example, the secondary OMA DM server 102 may send a short message service system type message to a mobile communication device 124 associated with the third party reseller to initiate an OMA DM communication session. At block 304, firmware is downloaded to a limited number of mobile communication devices 124 from a sandbox 112 of a secondary DM server and tested on the mobile communication devices 124, wherein the sandbox 112 is an area in a memory to isolate untested firmware or firmware under test from the environment outside the sandbox and wherein the secondary DM server makes available a subset of the functionality of a DM server. For example, firmware may be stored in the sandbox 112 within the secondary OMA DM server 102 for a limited number of the mobile communication devices 124 associated with the third party reseller to download and test.

At block 306, when the firmware meets predefined criteria, request a primary DM server to move the tested firmware to a production area 114, where the firmware stored in the production area is available to more mobile communication devices 124. For example, when the tested firmware meets predefined criteria of the primary OMA DM server 116, the secondary OMA DM server 102 may request the primary OMA DM server 116 to move the qualified firmware to the production area 114. When the qualified firmware is moved to the production area 114, the firmware is available to more mobile communication devices 124 associated with the third party for downloading. For example, the firmware stored in the production area 114 may be available to all mobile communication devices 124 associated with the third party reseller.

Figure 4:
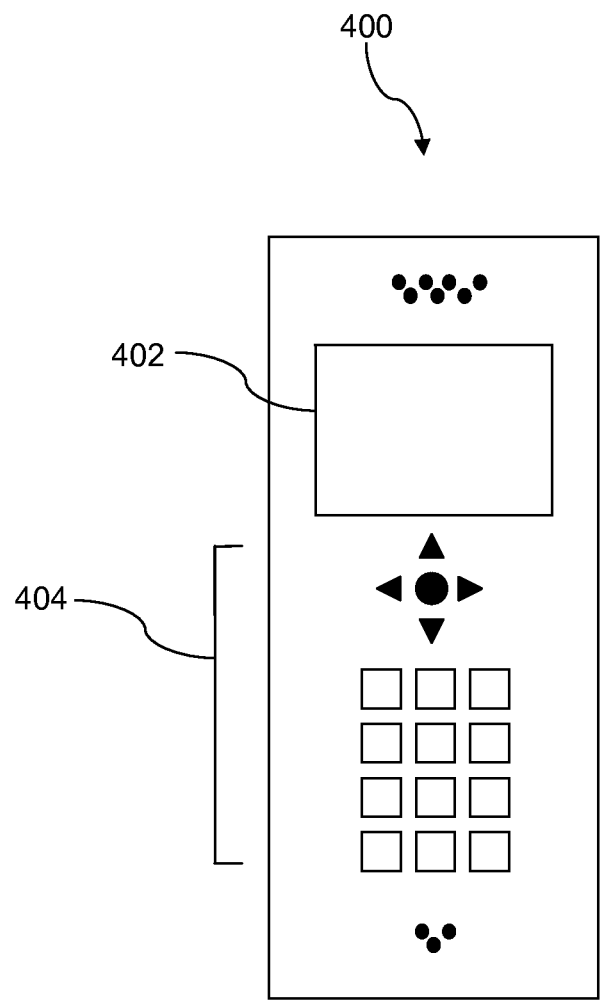
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
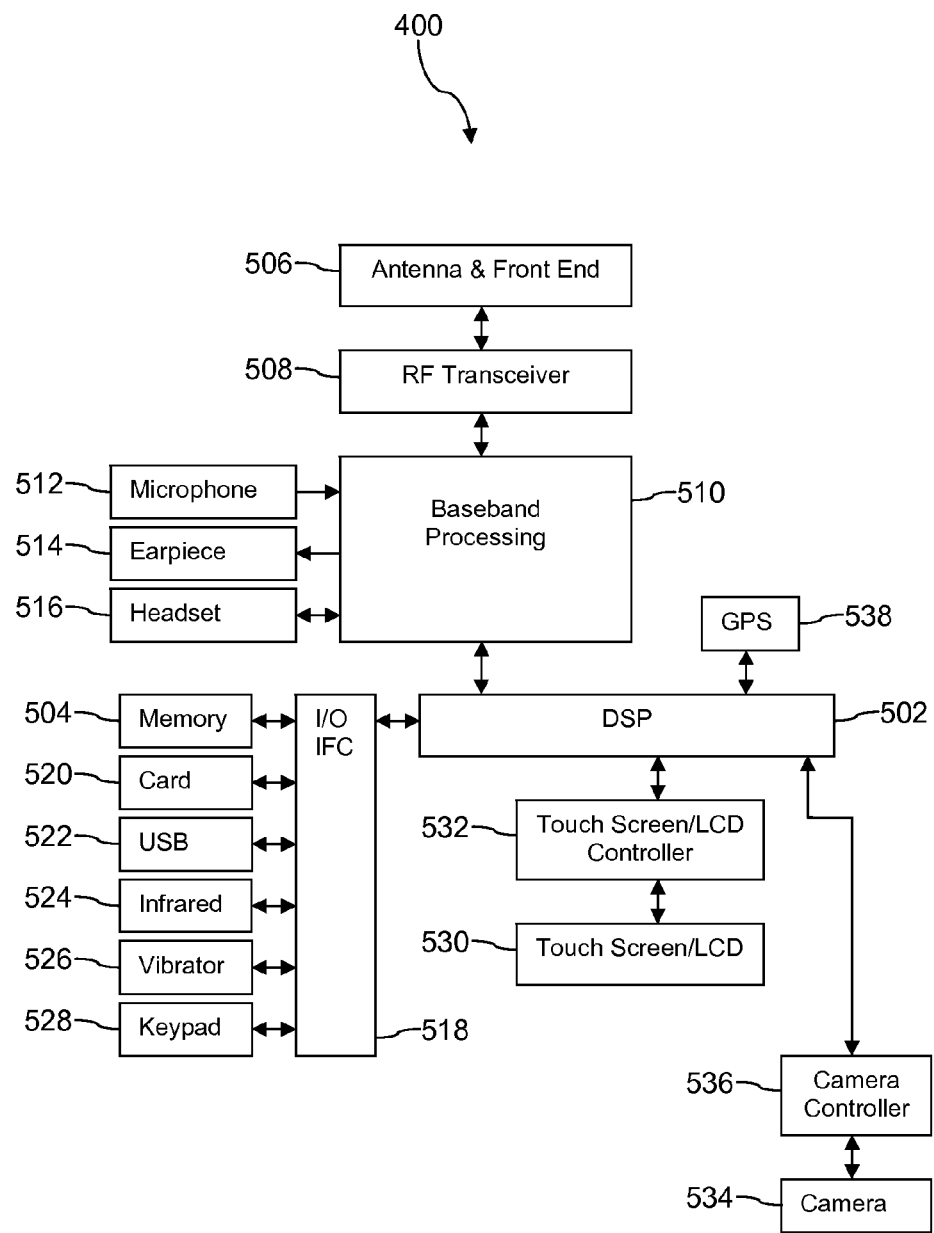
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
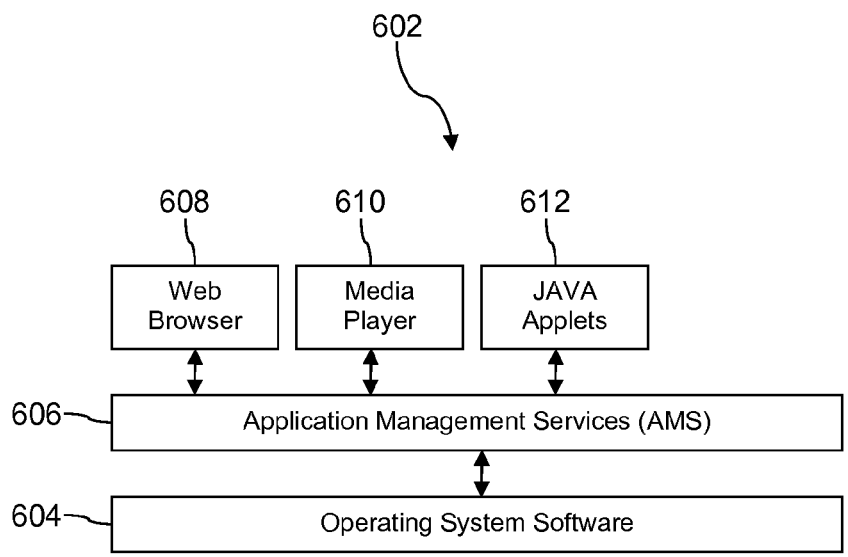
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
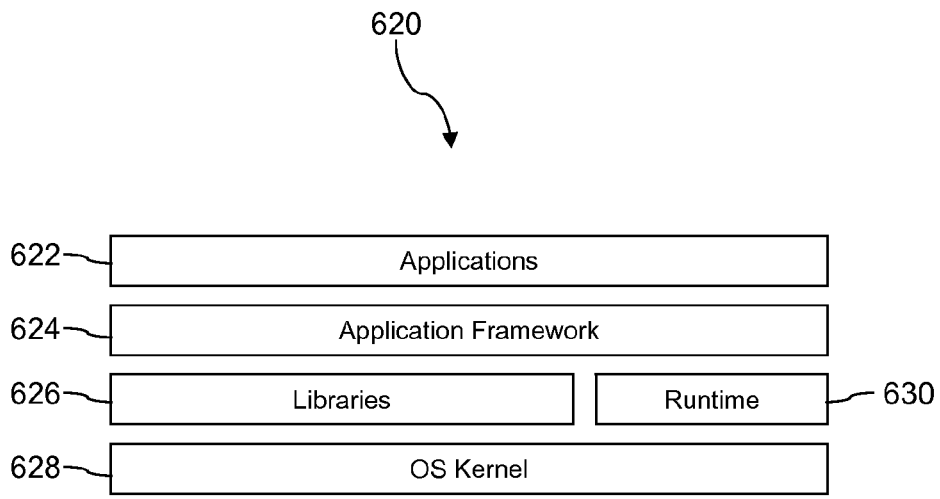
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
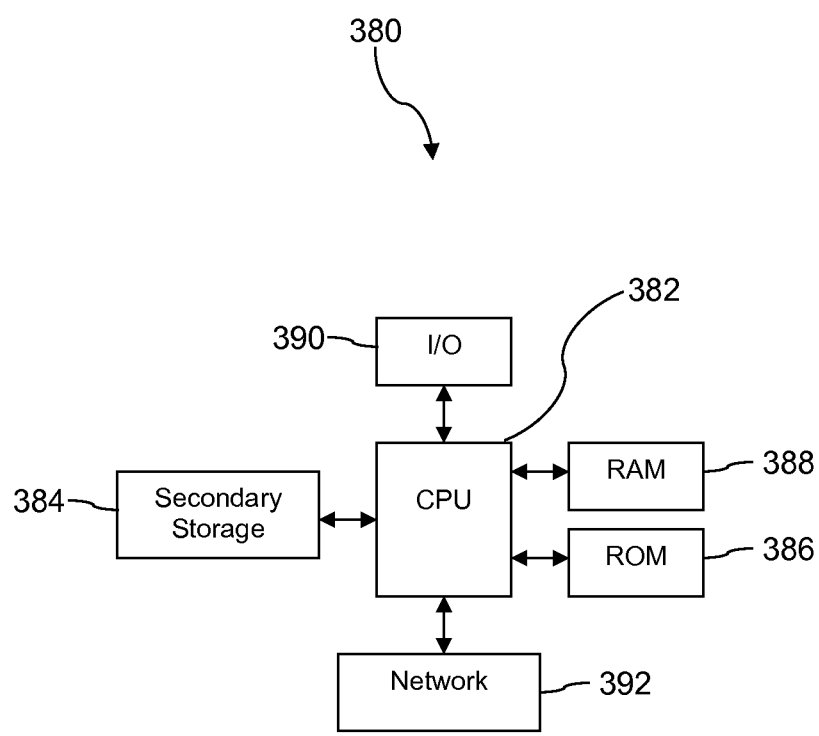
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system, comprising:
   mobile communication devices; and
   a secondary device management (DM) server that comprises a memory, a processor, and an application programming interface (API), wherein the secondary DM server makes available a subset of the functionality of a primary DM server and when accessed through a portal,
      initiates a DM session with a short message service (SMS) system type message,
      notifies the mobile communication devices associated with a trusted third party of the secondary DM server via the short message service system type message,
      makes available firmware to be downloaded from a sandbox of the secondary DM server and tested by a limited number of the mobile communication devices associated with the third party, wherein the sandbox is an area in a memory to isolate untested firmware or firmware under test from the environment outside the sandbox,
      deletes problematic firmware from the sandbox, and
      requests the primary server to move tested firmware that meets predefined criteria to a production area of the secondary DM server,
      whereby the third party has restricted access to the firmware activation or updating process.

2. The system of claim 1, wherein the portal is an application programming interface (API) built to access the secondary DM server.

3. The system of claim 1, wherein the secondary DM server is a server computer separated from primary DM server computers.

4. The system of claim 1, wherein a field of mobile communication devices are assigned to be accessible to the testing sandbox at initiation.

5. The system of claim 1, wherein the limited number of mobile communication devices are moved from the group accessible to the testing sandbox to a production group accessible to a production area within a predetermined period of time when the tested firmware meets the criteria.

6. The system of claim 5, wherein the process of testing firmware is audited with the criteria.

7. The system of claim 1, wherein the mobile communication devices are one or more of a laptop computer, a notebook computer, a tablet computer, a mobile phone, or a personal digital assistant (PDA).

8. The system of claim 1, wherein the mobile communication devices are provided with radio communications by a radio frequency transceiver within each mobile communication device based on at least one of code division multiple access (CDMA), global system for mobile communication (GSM), long term evolution (LTE), or worldwide interoperability for microwave access (WiMAX) wireless communication protocols.

9. A method of managing mobile communication devices through a third party portal, comprising:
   initiating a device management (DM) session between a secondary DM server and a client application on a mobile communication device with a short message service system type message from the secondary DM server, wherein the secondary DM server makes available a subset of the functionality of a primary DM server;
   notifying the mobile communication devices associated with the third party of the secondary DM server via the short message service system type message;
   making available firmware to be downloaded from a sandbox of the secondary DM server and tested by a limited number of the mobile communication devices associated with the third party, wherein the sandbox is an area in a memory to isolate untested firmware or firmware under test from the environment outside the sandbox;
   auditing a testing process by the primary DM server based on predefined criteria;
   deleting problematic firmware from the sandbox; and
   when the firmware meets the criteria, requesting the primary DM server to move the tested firmware to a production area, where the firmware stored in the production area is available to more mobile communication devices;
   whereby the third party has restricted access to the firmware activation or updating process.

10. The method of claim 9, wherein selected communication bands are turned on for the mobile communication devices associated with the third party under predefined circumstances.

11. The method of claim 9, wherein the secondary DM server communicates with the client application with selected wireless technology.

12. The method of claim 9, wherein a workflow engine is utilized to manage privileges of the application programming interface.

13. The method of claim 9, wherein payloads are sent to mobile communication devices from regional DM servers.

14. The method of claim 9, wherein the secondary DM server is on a server computer separated from primary DM servers.

15. The method of claim 9, wherein the primary DM servers have two levels of privileges, testing and proposal level and secondary level.

16. The method of claim 15, wherein different third party resellers have different levels of privileges.

17. A method of managing mobile communication devices through a third party portal, comprising:
   initiating a device management (DM) session with a short message service system type message;
   downloading firmware to a limited number of mobile communication devices from a sandbox of a secondary DM server and testing the firmware on the limited number of mobile communication devices, wherein the sandbox is an area in a memory to isolate untested firmware or firmware under test from the environment outside the sandbox, and wherein the secondary DM server makes available a subset of the functionality of a DM server; and
   when the firmware meets predefined criteria, requesting a primary DM server to move the tested firmware to a production area, where the firmware stored in the production area is available to more mobile communication devices.

18. The method of claim 17, wherein a network status of the mobile communication devices is sent to the secondary DM server in a message.

19. The method of claim 17, wherein the secondary DM server accesses the mobile communication devices through a web service application programming interface as a portal.

20. The method of claim 19, wherein visibility is tied to both a third party identification (ID) and the sandbox.

* * * * *